United States Patent [19]
Meller

[11] Patent Number: 5,148,608
[45] Date of Patent: Sep. 22, 1992

[54] EDGE SENSOR WITH MULTI-SIZE OUTER ENGAGEMENT SURFACES

[76] Inventor: Moshe Meller, 175 Oberlin Ave., Lakewood, N.J. 08701

[21] Appl. No.: 694,950

[22] Filed: May 1, 1991

[51] Int. Cl.$^5$ .............................................. G01B 7/00
[52] U.S. Cl. .......................................... 33/561; 33/644
[58] Field of Search ............... 33/561, 644, 642, 638, 33/558, 556, 559, 626, 555, 639

[56] References Cited

U.S. PATENT DOCUMENTS

| | | | |
|---|---|---|---|
| 1,289,640 | 12/1918 | Buchanan | 33/642 X |
| 4,621,436 | 11/1986 | Kurimoto | 33/561 |
| 4,829,677 | 5/1989 | Yuzuru | 33/642 X |

*Primary Examiner*—Harry N. Haroian
*Attorney, Agent, or Firm*—Frishauf, Holtz, Goodman & Woodward

[57] ABSTRACT

An edge sensor includes a housing having an outer grasping surface adapted to be grasped by a collet, the outer grasping surface having a plurality of different outer dimensions for engagement with different sized collets, respectively; a metal ball extending from the housing for contacting a workpiece; a plurality of light emitting diodes for indicating contact of the workpiece with the ball; a spring holding the ball to the housing in a centered manner; and electrical wires within the housing for enabling energizing of the light emitting diodes in response to contacting of the workpiece with the ball.

13 Claims, 1 Drawing Sheet

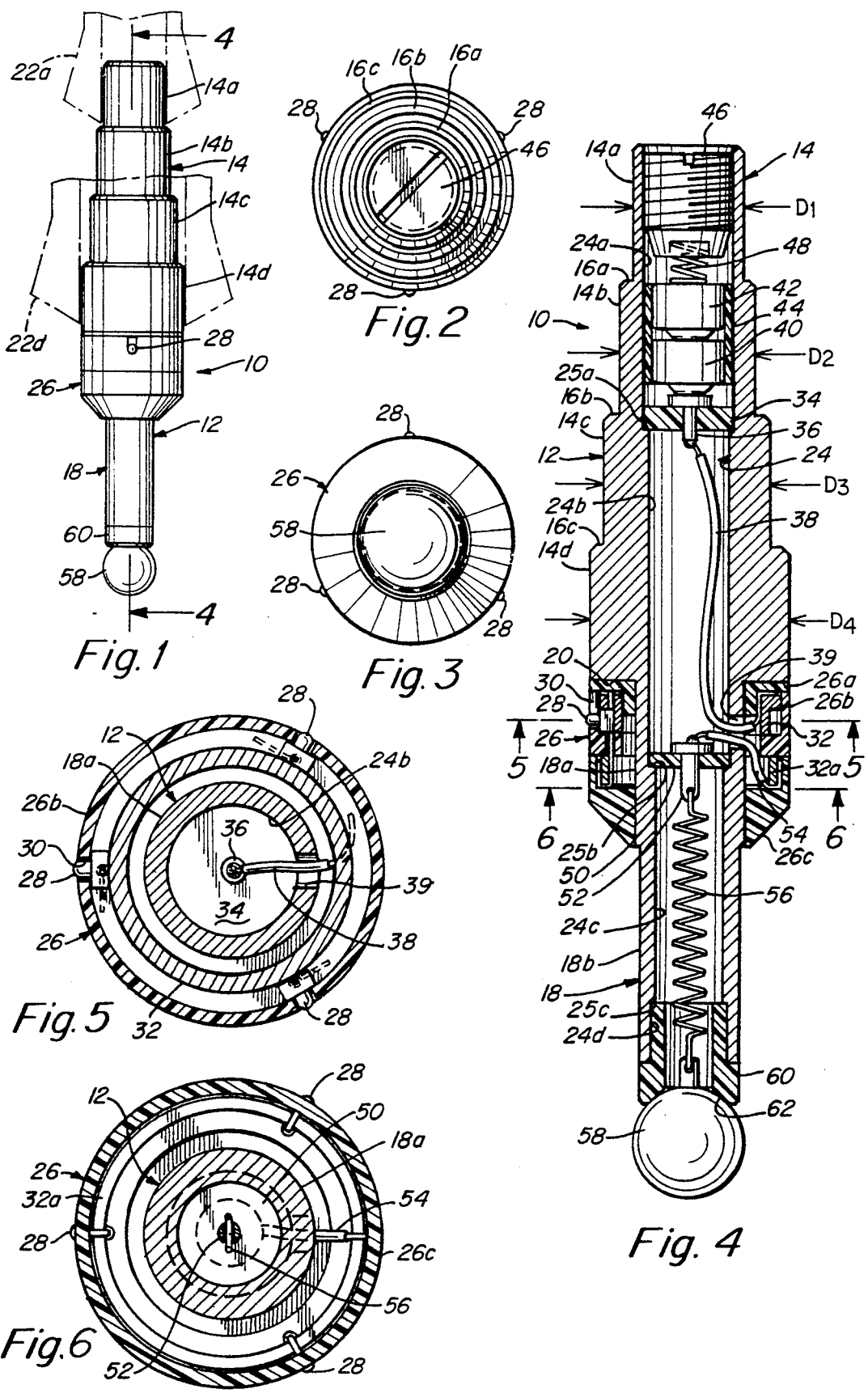

EDGE SENSOR WITH MULTI-SIZE OUTER ENGAGEMENT SURFACES

BACKGROUND OF THE INVENTION

The present invention relates generally to edge detecting mechanisms, and more particularly, is directed to an edge sensor with plural size surface portions for engaging a tool holder or the like.

When machining a workpiece, it is important that the cutter or other tool accurately follow a desired path. Accordingly, it is known to use an electronic edge sensor or edge finder, for example, as sold under Model Number EEF-1 by Travers Tool Co., Inc. of Flushing, N.Y. Such an electronic edge sensor is mounted in a tool-holding collet of a machine tool and thereby moves with the collet. As a result, a probe of the electronic edge sensor can ride along the workpiece. When the probe or tip portion of the edge sensor contacts the workpiece, an electrical circuit is closed through the workpiece, the collet, and the machine tool, to cause a plurality of, for example, three battery powered light emitting diodes (LEDs) of the electronic edge sensor to be illuminated. This indicates to the operator of the tool that the edge of a workpiece has been found. The edge sensor, with an appropriate probe tip, can also be used to measure the height of a workpiece in the vertical direction.

Such an electronic edge sensor is generally formed with a generally cylindrical housing from which the probe extends. However, because of the varying sizes of collets used with existing tools, such an electronic edge sensor is limited to use with collets of only a limited size range. Different diameter edge sensors must be used for various different diameter collets, thus requiring having a number of different edge sensors on hand.

OBJECTS AND SUMMARY OF THE INVENTION

Accordingly, it is an object of the present invention to provide an edge sensor that overcomes the aforementioned problems.

It is another object of the present invention to provide an edge sensor that can be used with various sized collets over a wide range of diameters.

It is still another object of the present invention to provide an edge sensor that is relatively easy and inexpensive to manufacture and operate.

In accordance with an aspect of the present invention, an edge sensor includes a housing having an outer grasping surface adapted to be grasped by a collet, the outer grasping surface having a plurality of different outer dimensions for engagement with different sized collets, respectively; probe means extending from the housing for contacting a workpiece; indicator means for indicating contact of the workpiece with the probe means; and electrical means mounted within the housing for energizing the indicator means in response to contacting of the workpiece with the probe means.

The above and other objects, features and advantages of the present invention will become readily apparent from the following detailed description, which is to be read in connection with the accompanying drawings.

BRIEF DESCRIPTION OF THE DRAWINGS

FIG. 1 is an elevational view of an edge sensor according to one embodiment of the present invention, as held by a collet;

FIG. 2 is a top plan view of the edge sensor of FIG. 1;

FIG. 3 is a bottom plan view of the edge sensor of FIG. 1;

FIG. 4 is a cross-sectional view of the edge sensor of FIG. 1, taken along line 4—4 thereof;

FIG. 5 is a cross-sectional view of the edge sensor of FIG. 4, taken along line 5—5 thereof; and FIG. 6 is a cross-sectional view of the edge sensor of FIG. 4, taken along line 6—6 thereof.

DETAILED DESCRIPTION OF A PREFERRED EMBODIMENT

Referring to the drawings in detail, an edge sensor 10 according to one embodiment of the present invention, includes an elongate tubular-like metal housing 12 having an outer collet grasping surface 14 formed by four contiguous outer cylindrical surfaces 14a, 14b, 14c and 14d, with increasing diameters D1, D2, D3 and D4, respectively. Cylindrical outer surface portions 14a, 14b, 14c and 14d are separated by annular shoulders 16a, 16b and 16c, respectively. Housing 12 is formed with a probe outer surface 18 below the largest-diameter outer cylindrical surface 14d. In the shown embodiment, probe outer surface 18 generally has the same outer diameter as outer cylindrical surface 14a, and is separated from outer largest-diameter surface portion 14d by an annular shoulder 20. The outer surface portion 18, however, need not have the same diameter or outer size as the smallest size portion 14a. In actuality, probe outer surface 18 may be formed by two slightly different diameter portions 18a and 18b, although this is not essential to the present invention.

It will be appreciated from the above that, because of the different diameters D1, D2, D3 and D4 of outer cylindrical surfaces 14a, 14b, 14c and 14d, respectively, the edge sensor 10 can be used with different sized collects. For example, diameters D1, D2, D3 and D4 can have diameters of ⅜", ½", ⅝" and ¾", respectively. This is best shown in FIG. 1 in which a collet 22a (shown in dashed lines) is grasping outer cylindrical surface 14a. As also shown in FIG. 1, a different sized collet 22d (shown in dashed lines) can be used to grasp outer cylindrical surface 14d. As a result, edge sensor 10 according to the present invention can be used with a multitude of different types of machinery having respective different size or diameter collects or tool holding chucks, without requiring having a corresponding number of different size edge sensors. This is the essence of the present invention.

Housing 12 is provided with an axial bore 24 which is segregated into contiguous bore sections 24a, 24b, 24c and 24d. The respective inner diameters of sections may be as shown or may be different, depending upon the internal construction of the device. The respective inner diameters may have, for example, the shown relationship $d1 > d2 > d3 < d4$, with d2 being approximately equal to d4. Bore section 24a corresponds generally in position to outer cylindrical surfaces 14a and 14b, bore section 24b corresponds generally in position to cylindrical surfaces 14c and 14d and portion 18a of probe outer surface 18, and bore sections 24c and 24d correspond generally in position to probe outer surface 18.

As a result, there are a plurality of inner annular shoulders 25a, 25b and 25c between contiguous bore sections 24a, 24b, 24c and 24d.

An insulated hollow carrier ring-like member 26 composed of members 26a, 26b, 26c is secured by an adhesive, press-fit or the like to annular shoulder 20 and portion 18a of probe outer surface 18. A plurality of equiangularly spaced light emitting diodes (LEDs) 28 are positioned within carrier member 26 and extend through holes 30 in the outer wall of carrier member 26b so as to be visible by an operator of the tool. In this manner, 360° visibility is provided. In the drawing, three LEDs 28 are shown, although this number may vary.

Two annular brass metal rings 32, 32a are positioned within carrier member 26, in electrical contact with each LED 28. Accordingly, current supplied to metal rings 32, 32a can be transferred to LEDs 28 to illuminate the same. In this regard, an insulated disk 34 is positioned within the upper end of housing 12 and sits upon annular internal shoulder 25a. An electrical contact 36 is centrally connected through disk 34, and a wire 38 extends through a side-wall opening or hole 39 in housing 12 and connects electrical contact 36 to first annular metal ring 32. Two batteries 40 and 42 are positioned within the upper portion of bore 24 so as to seat upon electrical contact 36. In this regard, an annular insulating spacer 44 is provided in surrounding relation to batteries 40 and 42 so as to prevent electrical contact between batteries 40 and 42 and housing 12. In order to ensure electrical contact between battery 40 and electrical contact 36, the inner wall of bore section 24a is threaded, a screw 46 is threadedly received therein, and a coil spring 48 is positioned between screw 46 and battery 42 in order to bias battery 40 into contacting relation with electrical contact 36.

A further insulating disk 50 is seated upon inner annular shoulder 25b. An electrical contact 52 is centrally connected through disk 50, and a wire 54 connects electrical contact 52 to second annular metal ring 32a. A metal coil spring 56 has one end connected to electrical contact 52, and a metal ball 58 extends from the opposite end thereof.

An insulated seating member 60 is press-fit into (or otherwise adhered to) the lower end of bore 24 until the end thereof abuts against inner annular shoulder 25c. Coil spring 56 extends through seating member 60. The lower open end 62 of seating member 60 has a conical configuration. Accordingly, when coil spring 56 pulls metal ball 58 upwardly, metal ball 58 seats centrally within conical lower open end 62 so that the center of ball 58 is positioned along the central axis of housing 12. The reason for connecting ball 58 by means of coil spring 56 is to provide centering of ball 58, and more importantly, to prevent damage to edge sensor 10 if too much force is applied to ball 58.

With the arrangement described above, when a tool holder with the edge sensor mounted therein is moved toward a desired location on an electrically conductive workpiece, edge sensor 10, which is held in a collet, is moved. When the tool holder is at the desired location, metal ball 58 will just be in contact with an edge of the workpiece. As a result, the electrical circuit including batteries 40 and 42 and metal ball 58 will be closed via the workpiece, the collet, and the machine tool. As a result, current is supplied via the closed electrical circuit to LEDs 28 to illuminate the same, and thereby indicate to the operator that the edge of the workpiece has been sensed or that the tool holder is at the correct or desired position. The center of the collet (that is, the center of the shaft of the tool which is to be placed in the collet) is spaced from the sensed edge of the workpiece a distance half the diameter of the metal ball 58 from the edge of the workpiece.

It is pointed out that the metal ball probe tip of the edge sensor described hereinabove is shown only by way of example. Other types of probe tips, such as cylinders, rod-shaped members, sharp pointed members or other shaped tips can be used, as desired, depending upon application. So long as the probe tip is made of a metallic or other conducting material, the electrical circuit will be closed when the probe tip touches a metal workpiece, thereby illuminating the LEDs to illuminate same, to indicate to the operator that the edge sensor has contacted the workpiece. As mentioned hereinabove, it is possible to use the device of the present invention to measure the height of a workpiece in a vertical direction, with the appropriate probe tip thereon. Operation is substantially the same.

It is important to the present invention that a single edge sensor 10 can be used with different sized collets having a wide range of tool holding diameters and accordingly, the edge sensor 10 can be used with a multitude of different types of machinery having different size collets or tool holders. This sharply reduces the number of different size edge sensors that heretofore had to be kept readily available for use, thus reducing expense to the operator.

While the edge sensor of the present invention has been illustrated in a specific embodiment wherein the edge sensor has four different size outer diameters D1, D2, D3 and D4, having respective diameters of $\frac{3}{8}''$, $\frac{1}{2}''$, $\frac{5}{8}''$ and $\frac{3}{4}''$, respectively, it should be clear that various other configurations could be provided. For example, different ranges of diameters can be provided, starting below $\frac{3}{8}''$, starting above $\frac{3}{4}''$, or starting at an intermediate diameter between $\frac{3}{8}''$ and $\frac{3}{4}''$ inch. Also, the steps in diameters may be other than $\frac{1}{8}''$ as shown. Still further, while the illustrated design has four different size engaging diameters, fewer or more could be provided. For example, two or three different steps could be provided to provide a more limited range of engagement possibilities, depending upon the circumstances involved. If the edge sensor can be made longer, then more than different size portions could be provided, again depending upon the type and configuration of system with which the edge sensor is to be used. If the diameter is to be made substantially smaller than $\frac{3}{8}''$ (the smallest diameter shown in FIG. 4), then modifications to the electrical supply system should be provided, for example by using smaller diameter batteries, rearranging the batteries in a different manner, or the like. The specific size, shapes, configurations, etc. have been shown herein by way of example and should not be deemed limiting of the invention.

Having described a specific preferred embodiment of the invention with reference to the accompanying drawings, it will be appreciated that the present invention is not limited to that specific embodiment, and that various changes and modifications can be effected therein by one of ordinary skill in the art, without departing from the scope or spirit of the invention as defined in the appended claims.

What is claimed is:

1. An edge sensor comprising:

a rigid metallic housing member having an outer grasping surface adapted to be grasped by a collet, said outer grasping surface having plurality of different outer dimensions for engagement with respective different sized collets, said outer grasping surface including a plurality of contiguous, co-axial outer cylindrical surfaces having respective different diameters;

a rigid metallic probe member extending from said housing member for contacting a workpiece, said probe member and said housing member comprising a single unitary rigid metallic member made from a single piece of rigid metallic material, said probe member having a tip end portion remote from said housing member;

a metal contact member mounted to said tip end portion of said probe member and arranged for contacting a workpiece, said metal contact member being electrically insulated from said tip end portion of said probe member;

indicator means for indicating contact of the workpiece with said metal contact member of said probe member; and electrical means mounted within at least one of said housing member and said probe member for energizing said indicator means in response to contacting of the workpiece with said metal contact member of said probe means.

2. An edge sensor according to claim 1, wherein said outer cylindrical surfaces have successively larger diameters, respectively, starting from an end of said housing opposite from said probe member.

3. An edge sensor according to claim 1, wherein there are four said contiguous, co-axial outer cylindrical surfaces.

4. An edge sensor according to claim 3, wherein said four contiguous, co-axial outer cylindrical surfaces have outer diameters of about ⅜", ½", ⅝", ¾", respectively.

5. An edge sensor according to claim 1, wherein said indicator means includes a plurality of light emitting devices mounted to said housing.

6. An edge sensor according to claim 1, wherein said metal contact member includes a metal ball mounted to said tip end portion of said probe member.

7. An edge sensor according to claim 6, further comprising probe protection means in at least one of said housing member and probe member for protecting said probe member against excessive force applied against said ball.

8. An edge sensor according to claim 7, wherein said probe protection means includes spring means for connecting said ball to said probe member.

9. An edge sensor according to claim 1, further including ball centering means for centering said ball with respect to said housing member, said ball centering means including substantially conical centering means for holding said ball in a centered position with respect to said housing member, and spring means for biasing said ball into engagement with said substantially conical centering means.

10. An edge sensor according to claim 9, wherein said energizing means includes power means for supplying power to said indicator means, and conductor means for connecting said spring means to said indicator means and for connecting said power means to said indicator means such that contact of the workpiece with said metal ball completes an electrical circuit and energizes said indicator means.

11. An edge sensor according to claim 1, wherein said electrical means is electrically coupled to at least one of said housing and said probe member, to said metal contact member, and to said indicator means.

12. An edge sensor according to claim 10, wherein said substantially conical centering means is made of an insulating material to insulate said ball from said housing member.

13. An edge sensor according to claim 1, further comprising an insulating member mounted at the tip end portion of said probe member and arranged between said metal contact member and said probe member, for electrically insulating said metal contact member from said tip end portion of said probe member.

* * * * *